US008636029B2

(12) United States Patent
Ott et al.

(10) Patent No.: US 8,636,029 B2
(45) Date of Patent: Jan. 28, 2014

(54) COLOR CHANGER

(75) Inventors: Winfried Ott, Rodgau (DE); Joachim Kunkel, Rothenbuch (DE); Burkhard Bilz, Goldbach (DE); Udo Klein, Dietzenbach (DE)

(73) Assignee: Lactec GmbH, Rodgau (DE)

( * ) Notice: Subject to any disclaimer, the term of this patent is extended or adjusted under 35 U.S.C. 154(b) by 293 days.

(21) Appl. No.: 13/225,887

(22) Filed: Sep. 6, 2011

(65) Prior Publication Data

US 2012/0055570 A1 Mar. 8, 2012

(30) Foreign Application Priority Data

Sep. 6, 2010 (EP) .................................... 10009212

(51) Int. Cl.
*F16K 11/00* (2006.01)

(52) U.S. Cl.
USPC ............ 137/606; 137/602; 137/884; 239/303

(58) Field of Classification Search
USPC .......... 137/602, 605, 606, 884; 239/266, 303, 239/335
See application file for complete search history.

(56) References Cited

U.S. PATENT DOCUMENTS

| | | | | |
|---|---|---|---|---|
| 3,373,762 | A * | 3/1968 | Korchak | 137/240 |
| 4,163,523 | A * | 8/1979 | Vincent | 239/305 |
| 4,231,392 | A * | 11/1980 | Allibert | 137/454.2 |
| 4,306,587 | A * | 12/1981 | Tchebinyayeff | 137/606 |
| 4,546,922 | A * | 10/1985 | Thometz | 239/304 |
| 4,627,465 | A * | 12/1986 | Kolibas et al. | 137/563 |
| 4,846,226 | A * | 7/1989 | Merritt | 137/871 |
| 5,146,950 | A * | 9/1992 | Rodgers et al. | 137/563 |
| 5,653,259 | A * | 8/1997 | Ramstad | 137/606 |
| 5,759,277 | A * | 6/1998 | Milovich et al. | 118/629 |
| 5,853,027 | A * | 12/1998 | Winkel et al. | 137/624.18 |
| 6,619,563 | B2 * | 9/2003 | van der Steur | 239/125 |
| 6,682,001 | B2 * | 1/2004 | Diana | 239/305 |
| 6,705,545 | B1 * | 3/2004 | Sroka et al. | 239/112 |
| 6,935,366 | B2 * | 8/2005 | Ciarelli et al. | 137/565.01 |
| 7,097,121 | B2 * | 8/2006 | Giulano | 239/548 |
| 7,533,684 | B1 * | 5/2009 | Dalton et al. | 137/240 |
| 7,712,484 | B2 * | 5/2010 | Fukano et al. | 137/606 |

(Continued)

FOREIGN PATENT DOCUMENTS

| | | |
|---|---|---|
| DE | 3534269 A1 | 4/1987 |
| EP | 1384518 A2 | 1/2004 |
| EP | 1859872 A2 | 11/2007 |

*Primary Examiner* — John Rivell
*Assistant Examiner* — Minh Le
(74) *Attorney, Agent, or Firm* — Laurence A. Greenberg; Werner H. Stemer; Ralph E. Locher

(57) ABSTRACT

A color changer has a valve block for connecting a plurality of coating material lines to an application device. The valve block has a parallelepiped housing. The housing has a central color channel with an axial direction and contains valve bores for receiving valves and a length of a central color channel is as short as possible with a simultaneous supply of many paint feed lines. A first number of parallel valve bores open into the color channel at first openings, a second number of parallel valve bores open into the color channel at second openings on the opposite side of the color channel and offset in the axial direction with respect to the first number of valve bores. A third number of parallel valve bores open into the color channel at third openings and a fourth number of parallel valve bores open into the color channel at fourth openings.

15 Claims, 6 Drawing Sheets

(56) References Cited

U.S. PATENT DOCUMENTS

| | | | | |
|---|---|---|---|---|
| 8,333,164 | B2 * | 12/2012 | Herre et al. | 118/302 |
| 2003/0111118 | A1 * | 6/2003 | Diana | 137/606 |
| 2003/0234300 | A1 * | 12/2003 | Diana | 239/305 |
| 2004/0020535 | A1 * | 2/2004 | Di Gioia et al. | 137/240 |
| 2005/0029368 | A1 * | 2/2005 | Giulano | 239/548 |
| 2005/0029370 | A1 * | 2/2005 | Giulano | 239/569 |
| 2005/0279860 | A1 | 12/2005 | Fulkerson et al. | |
| 2006/0219807 | A1 * | 10/2006 | Fulkerson et al. | 239/112 |
| 2010/0012025 | A1 * | 1/2010 | Herre et al. | 118/300 |
| 2010/0176215 | A1 * | 7/2010 | Fulkerson et al. | 239/112 |
| 2011/0076411 | A1 * | 3/2011 | Nussbaum | 427/421.1 |
| 2013/0001326 | A1 * | 1/2013 | Seiz | 239/569 |

* cited by examiner

COLOR CHANGER

CROSS-REFERENCE TO RELATED APPLICATION

This application claims the priority, under 35 U.S.C. §119, of European application EP 10 009 212.1-2425, filed Sep. 6, 2010; the prior application is herewith incorporated by reference in its entirety.

BACKGROUND OF THE INVENTION

Field of the Invention

The invention relates to a color changer having at least one valve block for connecting a plurality of coating material lines to an application device. The valve block has a housing which is configured as a parallelepiped, and the housing has a central color channel with an axial direction and contains valve bores for receiving valves.

In modern coating assemblies, in particular in paint shops, the painting of objects, for example of bodies of motor vehicles, is carried out predominantly or even exclusively automatically and by machine. In processes of this type, paint is applied to the object to be painted with the aid of automatically controlled application devices. In many cases, not only one paint with a defined color is to be applied here by way of the same application device. Rather, it is usually required or desired to apply paints of different color one after another using the application device.

For this purpose, color changers or color change devices are usually provided which have a central color channel which is connected to the application device, and which have a multiplicity of color feed lines, via which different paints of different color can be fed to the color channel. The supply of the color through the color feed lines is usually regulated by valves which can preferably be actuated pneumatically. To this end, valve bores, into which the valves can be inserted, are provided in a valve block of the color changer. Upon actuation, that is to say when required, the valves open the passage from the respective color feed line to the central color channel. In this way, in each case the color channel can be opened, through which the currently required paint is fed. In many applications, a supply of paints with more than 10 or 20 different colors can be necessary. A color changer device or changing unit for coating material is known, for example, from published, European patent application EP 1 859 872 A2.

Before every color change, the central color channel has to be cleaned of residues of the previously used paint. It is ensured in this way that paints of different colors are not mixed directly after the change, as a result of which the quality of the paintwork would be impaired greatly. The paint which is removed from the color channel during the cleaning of the color channel is waste to a certain extent and is thus lost paint which can no longer be used for the paintwork. The longer and larger the color channel, the greater the quantities of paint which have to be disposed of before every color change. As a result, considerable costs are caused in large plants.

SUMMARY OF THE INVENTION

It is accordingly an object of the invention to provide a color changer which overcomes the above-mentioned disadvantages of the prior art devices of this general type, which is realized in a particularly compact configuration, with the result that the length of the central color channel can be kept as low as possible with a simultaneous supply of as many paint feed lines as possible.

With the foregoing and other objects in view there is provided, in accordance with the invention a color changer. The color changer contains at least one valve block for connecting a plurality of coating material lines to an application device. The valve block has a housing configured as a parallelepiped. The housing has a central color channel with an axial direction and a plurality of valve bores formed therein for receiving valves. The valve bores include a first number of substantially parallel valve bores opening into the color channel at first openings, and a second number of substantially parallel valve bores opening into the color channel at second openings on an opposite side of the color channel and offset in the axial direction with respect to the first number of valve bores. The valve bores further have a third number of substantially parallel valve bores opening into the color channel at third openings, in each case one of the first openings and one of the third openings opening into the color channel in a same axial position, and a fourth number of substantially parallel valve bores opening into the color channel at fourth openings. In each case one of the fourth openings and one of the second openings opening into the color channel in the same axial position.

According to the invention, the object is achieved by the fact that a first number of substantially parallel valve bores open into the color channel at first openings, and that a second number of substantially parallel valve bores open into the color channel at second openings on the opposite side of the color channel and offset in the axial direction with respect to the first number of valve bores. A third number of substantially parallel valve bores open into the color channel at third openings, in each case a first and a third opening opening into the color channel in the same axial position, and that a fourth number of substantially parallel valve bores open into the color channel at fourth openings, in each case a fourth and a second opening opening into the color channel in the same axial position.

The invention proceeds from the consideration that a substantial design criterion for the length of the central color channel is given by the spatial location and positioning of the valve bores for the pneumatically actuable valves. If, for example, the valves, as disclosed in published, European patent application EP 1 859 872 A2, are arranged in two rows which lie opposite one another in relation to the central color channel, the length of the color channel grows in each case by at least the width of the valve bore with each valve pair, in which the valves are arranged on respectively opposite sides of the color channel. In this way, color changers having 16 or more different color feed lines can be realized only with difficulty or not at all, since the color change device becomes too long and too heavy. In addition, the central color channel would become so long that the quantities of paint which are lost during the cleaning would prohibit economical use of a color changer of this type.

As has then been recognized, a compact housing with a short color channel can be realized by an optimized spatial arrangement of the valve bores around the color channel. An extremely compact design of the color changer can be achieved, in particular, by virtue of the fact that valves are arranged not only in two groups which lie on opposite sides of the color channel, all the valves lying, for example, in one plane, but also further groups of valves are brought close to the color channel. In order that the valve bores can open into the color channel, the first two groups of valve bores should be arranged here offset in the axial direction of the color channel with respect to one another. In this way, one of the further valve bores can always open into the color channel at the same axial position as a valve bore of one of the first two groups.

As a result of these further groups of valve bores, the dimensioning of the color changer increases in a direction perpendicular with respect to the axial direction of the color channel. At the same time, however, the length of the central color channel is extended only slightly by the axial offset of one of the two groups with respect to the other, in comparison with an embodiment with only two valve groups which are arranged on opposite sides of the color channel.

In other words, proceeding from a color changer with two groups of valve bores lying opposite the color channel, twice the number of valve bores can open into the color channel with an only slight lengthening of the central color channel.

In one preferred embodiment of the color changer, in each case the first, second, third and fourth number of valve bores form first, second, third and fourth valve bore rows respectively, in each case the first and the fourth, the second and the third, and the third and the fourth valve bore rows forming an acute angle with respect to one another. In this way, a particularly regular and compact construction is realized, in which there are four valve bore rows. The designation "row" here means that the valve bores are oriented in parallel with regard to their center axis and the center axes additionally lie in a common plane. Here, the acute angle is to be present in each case between the corresponding center axes of the valve bores.

The spacings between in each case two adjacent valve bores which lie in a row are preferably always identical. The minimum spacing between two adjacent valve bores has to satisfy different criteria. First, it should be as small as possible, in order to reduce the length of the central color channel to a minimum. Second, the spacing should be large enough, in order to afford space to the cylinders/the pistons for the valve actuation, the diameters of which have to be oriented to the usually available 6 bar of compressed air, and in order to prevent paint crossflow between different paint feed lines through the housing of the valve block.

The valve bores have to be accessible from the outer side of the housing, in order for it to be possible to insert valves into them. A very compact design of the color changer can be realized with a cuboidal housing, the first and the second valve bores emerging from the housing on opposite cuboid faces, and the third and the fourth valve bores emerging from the housing on a cuboid face which is perpendicular with respect to the cuboid faces. That is to say, in each case half as many valve bores emerge from the housing on two opposite cuboid faces as on the face which is perpendicular with respect to them. For satisfactory accessibility of the valve bores, it is advantageous here if, on this face, the valve bores emerge from the housing in each case close to the edge of the face.

In one preferred embodiment of the color changer, the valve block has a total of 16 valve bores. A corresponding number of feed lines for paint are provided, with the result that there is the possibility to select between 16 paints of different colors. In each case four valve bores of the first, second, third and fourth number are advantageously provided for a particularly compact design of the color changer. The valve bores preferably in each case form valve bore rows.

Since the quantity of paint which is lost during each color change is substantially proportional to the length of the color channel, the spacing between the color channel start and its end should be as small as possible. The spacing in the axial direction of the channel between the color channel start and the color channel end is therefore advantageously less than 120 mm.

The housing of the valve block advantageously has a plurality of feed line openings for the supply of paint. Furthermore, the color changer advantageously contains a paint connection plate which has paint feed channels which open into connections for paint feed lines. The paint connection plate can preferably be screwed to the housing of the valve block, the paint feed channels which are connected to the connections for paint feed lines being connected to the feed line openings in the screwed state. In this way, all the feed lines for paint can be disconnected in a simple way and simultaneously by unscrewing the paint connection plate from the housing. Each of the feed line openings is assigned in each case one valve bore for the supply of paint in the housing. The valve which is placed in each case into the valve bore opens the connection between the feed line opening and the central color channel as required.

In the above-described case, circulation of the paint within the color changer or return of the paint back into the corresponding storage containers is not provided. If circulation of this type is desired, the paint connection plate can comprise connections for paint discharging lines, the paint discharging lines and the paint feed lines being connected to one another in order to circulate the paint. The paint is supposed to circulate when the connection between the paint feed line and the color channel is closed.

In order to prevent a return flow of paint out of the valve block into the respective feed line, for example in the case of a defect of a valve, nonreturn valves are advantageously in each case arranged in the paint feed channels in the paint connection plate. Furthermore, it is advantageous to prevent the paint leaking out of the paint connection plate when it is dismantled from the valve block. For this purpose, nonreturn valves which prevent the leakage can advantageously be arranged in each case in the paint feed channels in the paint connection plate.

Instead of in each case two separate nonreturn valves being inserted into the paint feed channels for the two abovementioned functions, nonreturn valves which shut off both a return flow of paint out of the valve block into the respective paint feed line and a leakage of the paint out of the paint connection plate when it is dismantled from the valve block can also be arranged in each case in the paint feed channels. The nonreturn valves are advantageously configured as flatter valves.

A plurality of valve channels are advantageously provided in the housing of the valve block for pneumatic actuation of the valves which are inserted into the valve bores. Here, in each case one valve channel is advantageously assigned to a valve bore. In addition to this, an actuating plate can be provided which has a plurality of connections for actuating channels for valves, it being possible for the actuating plate to be screwed to the housing of the valve block, and the actuating channels being connected to the valve channels in the screwed state.

In one preferred embodiment of the color changer, pneumatically actuable valves which are in each case connected via the valve channels to a common compressed gas line are inserted into the valve bores, electrovalves which, if required, open the connection between the common compressed gas line and the respective actuating channels being inserted into the actuating plate, and a control unit which is connected electrically to the electrovalves being provided to control the electrovalves. The pressurized gas, by way of which the pneumatically actuable valves are actuated when required, is therefore routed in a common line to the valve channels. Here, the compressed gas line is advantageously connected to the actuating plate, with the result that the gas is guided through the compressed gas line into the actuating plate and, from there, is guided further through the actuating channels for valves into the valve channels.

In order to send the gas into the valve channels when required and therefore to actuate the valves, electrovalves which, when required, open the connection between the respective valve channel and the common compressed gas line are inserted into the actuating plate. Here, the electrovalves are actuated by a common control unit. This control unit can be configured, for example, as a bus-compatible microcontroller which communicates via a bus connection to a higher order controller which is programmable from memory. A common supply of this type of compressed gas simplifies the construction and the installation of a color changer in comparison with conventional systems, in which a dedicated compressed gas line has to be laid for each valve channel.

In many applications, the number of paint colors which can be fed to the application device by a valve block of this type is not sufficient. In one preferred embodiment, a color changer according to the invention therefore has two valve blocks and a center block with an application line, the color channel of the respective valve block being routed in each case via a connecting line into the center block and being connected to the application line for connection to the application device, and in each case one pneumatically actuable release valve which opens and closes the connection between the respective connecting line and the application line being provided for each connecting line. In comparison with a color changer having only one valve block, twice the number of paints of different color can be provided in this way.

As required, in each case the connection to only one of the two valve blocks can be produced by the pneumatically actuable release valve. Even in the case of now double the number of available paint colors, the paint waste is not greater on account of the construction with a center block, to which the two valve blocks are connected in each case, since two separate color channels are provided. If the valve block were simply lengthened, the color channel would also have grown to twice its length.

The advantages of the invention contain, in particular, that a color changer can be realized in a compact design as a result of the arrangement of four valve groups around a central color channel, and in which color changer the length of the central color channel can be kept as small as possible, with the result that the paint waste which is produced during every color change can be kept as low as possible. Additional waste can be avoided by the use of nonreturn valves in the paint feed channels of the paint connection plate, it being possible for both the leakage of paint during dismantling of the paint connection plate and undesired mixing of paint in the case of leaks within the valve block to be avoided.

Other features which are considered as characteristic for the invention are set forth in the appended claims.

Although the invention is illustrated and described herein as embodied in a color changer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Identical parts are provided with the same designations in all the figures.

Figure 1:
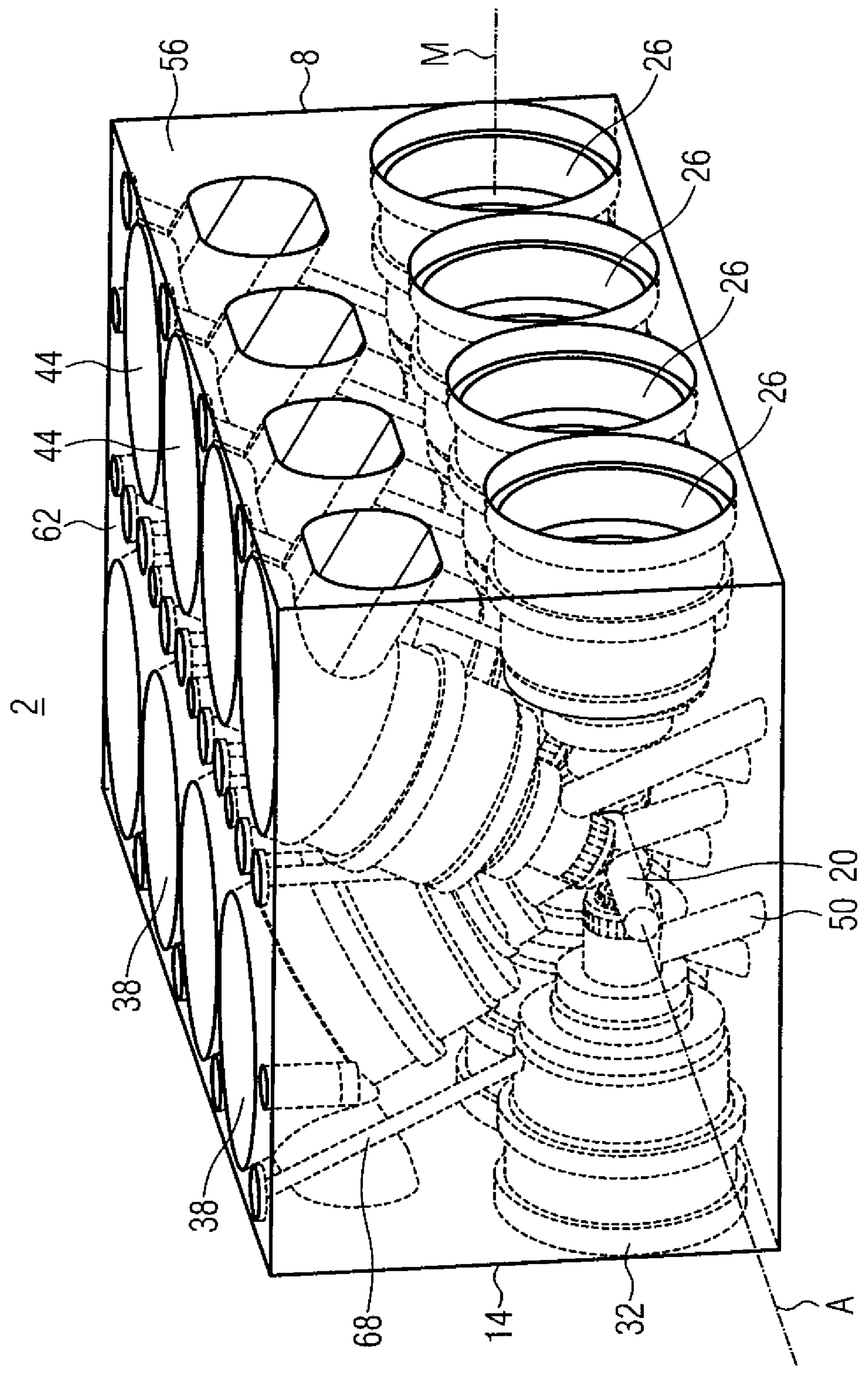
FIG. 1 is a diagrammatic, perspective view of a valve block of a color changer having a cuboidal housing, a central color channel and 16 valve bores in one preferred embodiment according to the invention.

Referring now to the figures of the drawing in detail and first, particularly, to FIG. 1 thereof, there is shown a valve block 2 for a color changer having a cuboidal housing 8. A central color channel 20 runs between a front face 14 and a non-illustrated rear face which lies opposite the front face 14. A total of sixteen valve bores 26, 32, 38, 44 are let into the housing 8, into which valve bores 26, 32, 38, 44 pneumatically actuable valves can be inserted. Furthermore, sixteen feed line openings for the supply of paint are let into the housing 8. In each case one feed line opening 50 is assigned to in each case one valve bore 26, 32, 38, 44. In the operating state, the valves which are inserted into the valve bores 26, 32, 38, 44 open a connection between the feed line opening 50 and a central color channel 20 as required. After opening or producing a connection of this type or after producing this connection, the paint can pass out of the feed line opening 150 into the central color channel 20 and in this way reach an application device which is connected to the color changer.

The valve block 2 is configured for keeping the length of the central color channel 20 between the front face and the rear face as small as possible, in order thus to keep the paint waste which accrues during color changes as low as possible. The compact design required for this purpose of the valve block 2 is made possible by a special arrangement of the valve bores 26, 32, 38, 44, which arrangement is to be described in the following text. Since the length and diameter of the valve bores 26, 32, 38, 44 are considerably greater than those of the feed line openings 50, the valve bores 26, 32, 38, 44 are critically responsible for the dimensioning of the valve block 2 and therefore also of the entire color changer.

Four valve bores 26 lead from a side face 56 into the housing 8. The valve bores 26 open in each case into the central color channel 20. The valve bores 26 are arranged effectively in a row or form a row. That is to say, the imaginary center axes of the bores are oriented parallel to one another and lie in one plane. The center axes of the bores in each case meet the central color channel 20. Furthermore, a center axes M stand perpendicularly on the side face 56. A further row of valve bores 32 is arranged on the opposite side of the central color channel 20. In a similar manner to the valve bores 26, the four valve bores 32 form a row. The center axes of the valve bores 32 and the center axes of the valve bores 26 are oriented parallel to one another. Furthermore, the center axes lie in one plane. In the axial direction A of the central color channel 20, the axial positions, at which the valve bores 26 open into the color channel 20, are offset laterally with respect to the openings of the valve bores 32.

Doubling of the number of valve bores in comparison with the previously described configuration with a constant length of the central color channel 20 is achieved by two further rows of valve bores 38, 44. The center axes of the valve bores 38 form an acute angle with respect to the center axes of the valve bores 26 and 32. As viewed in the axial direction A, the valve bores 38 open into the central color channel 20 at the same axial position as the valve bores 26. A fourth row of valve bores 44 is provided, the center axes of which form an acute angle with respect to the center axes of the valve bores 26 and 32. In the axial direction A, the valve bores 44 open into the color channel 20 at the same axial positions as the valve bores 32. Here, the axial position means in each case the distance of the opening from the start of the central color channel at the front face 14. The valve bores 38 and 44 open firstly into the color channel 20 in the interior of the housing 8, and secondly they adjoin the housing 8 at an upper face 62.

The valve bores 26, 32, 38, 44 are connected in each case to valve channels 68. A pressurized gas can be fed via the valve channels 68 to the valves which are inserted into the valve bores 26, 32, 38, 44, as a result of which the valves can be actuated pneumatically.

Figure 2:
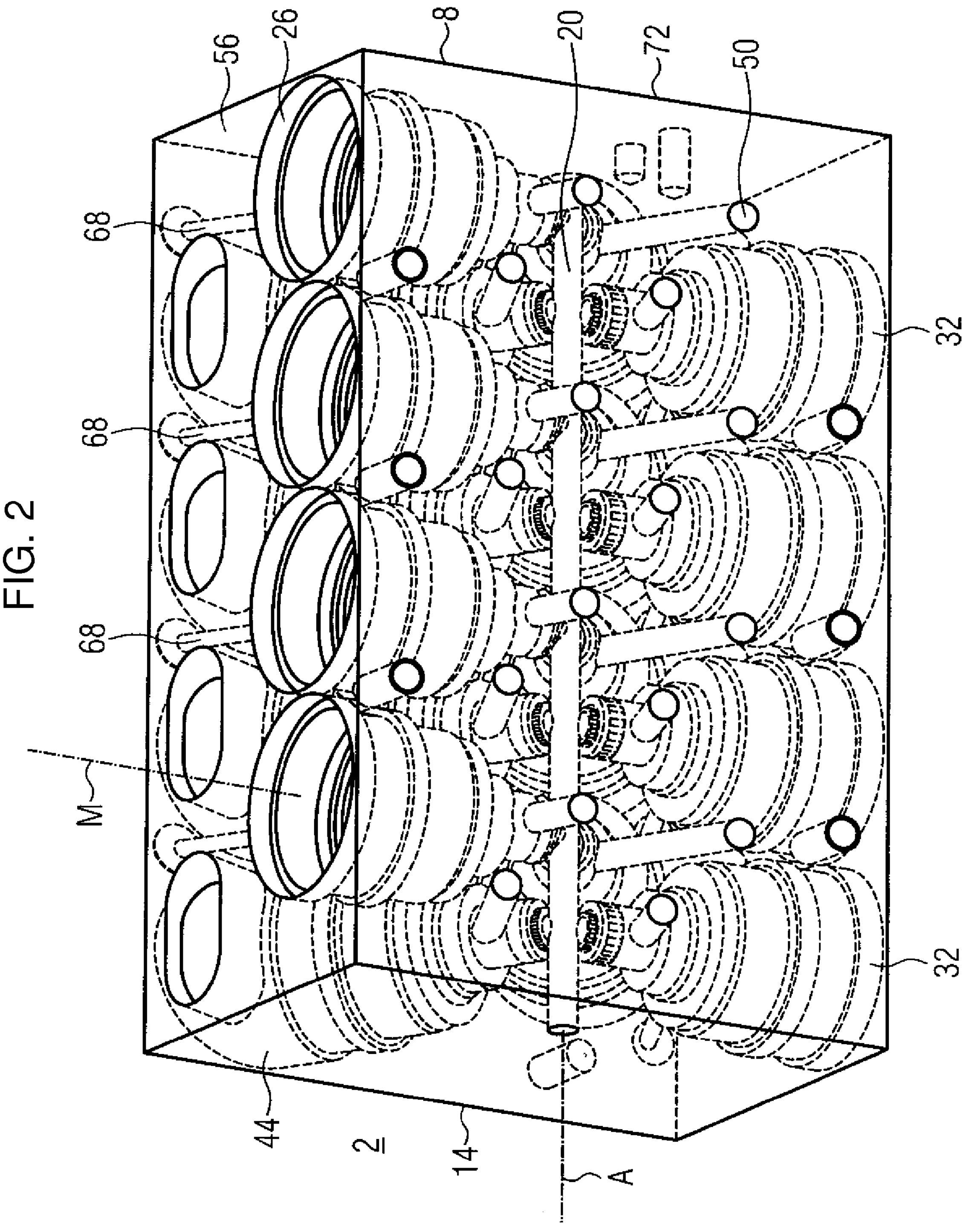
FIG. 2 is a diagrammatic, further perspective view of the valve block from FIG. 1.

The valve block 2 from FIG. 1 is shown in FIG. 2 from a further perspective. The length of the central color channel 20 between the front face 14 and the rear face 72 is <120 mm.

Figure 3:
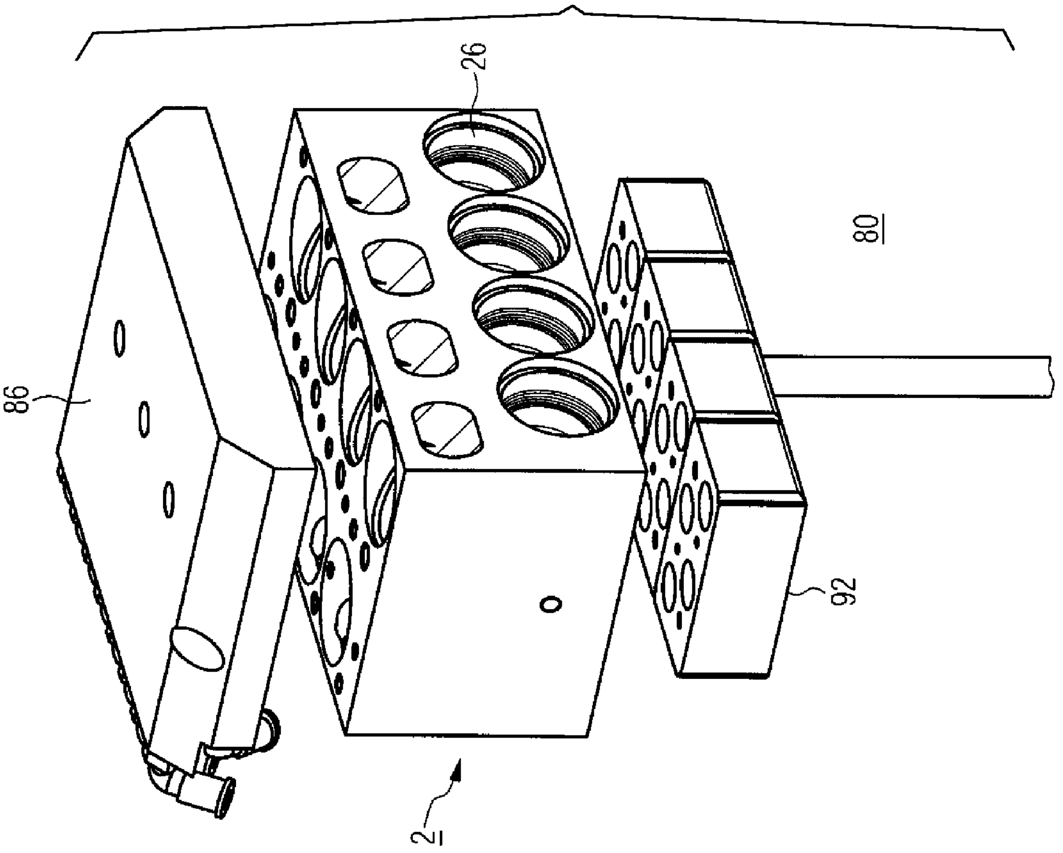
FIG. 3 is a diagrammatic, exploded perspective view of the color changer having the valve block according to FIGS. 1 and 2, a paint connection plate and an actuating plate in one preferred embodiment.

A color changer 80 is shown in one preferred embodiment in FIG. 3. The color changer 80 contains the valve block 2 according to FIGS. 1 and 2, an actuating plate 86 and a paint connection plate 92. Both the paint connection plate 92 and the actuating plate 86 can be screwed to the valve block 2 for simple assembly and dismantling. For stability reasons, the valve block 2 and the connection plates 86, 92 are preferably manufactured from stainless steel or aluminum, but a stable plastic can also be used as material for weight reduction reasons.

Nonreturn valves which prevent leakage of the paint when the paint connection plate is dismantled are inserted into the paint connection plate. Additional nonreturn valves prevent contamination of storage containers, from which the paint is guided under pressure into the paint connection plate, by in each case paint of another color. The position and precise function of the valves will be shown further below in conjunction with FIGS. 5 and 6.

Figure 4:
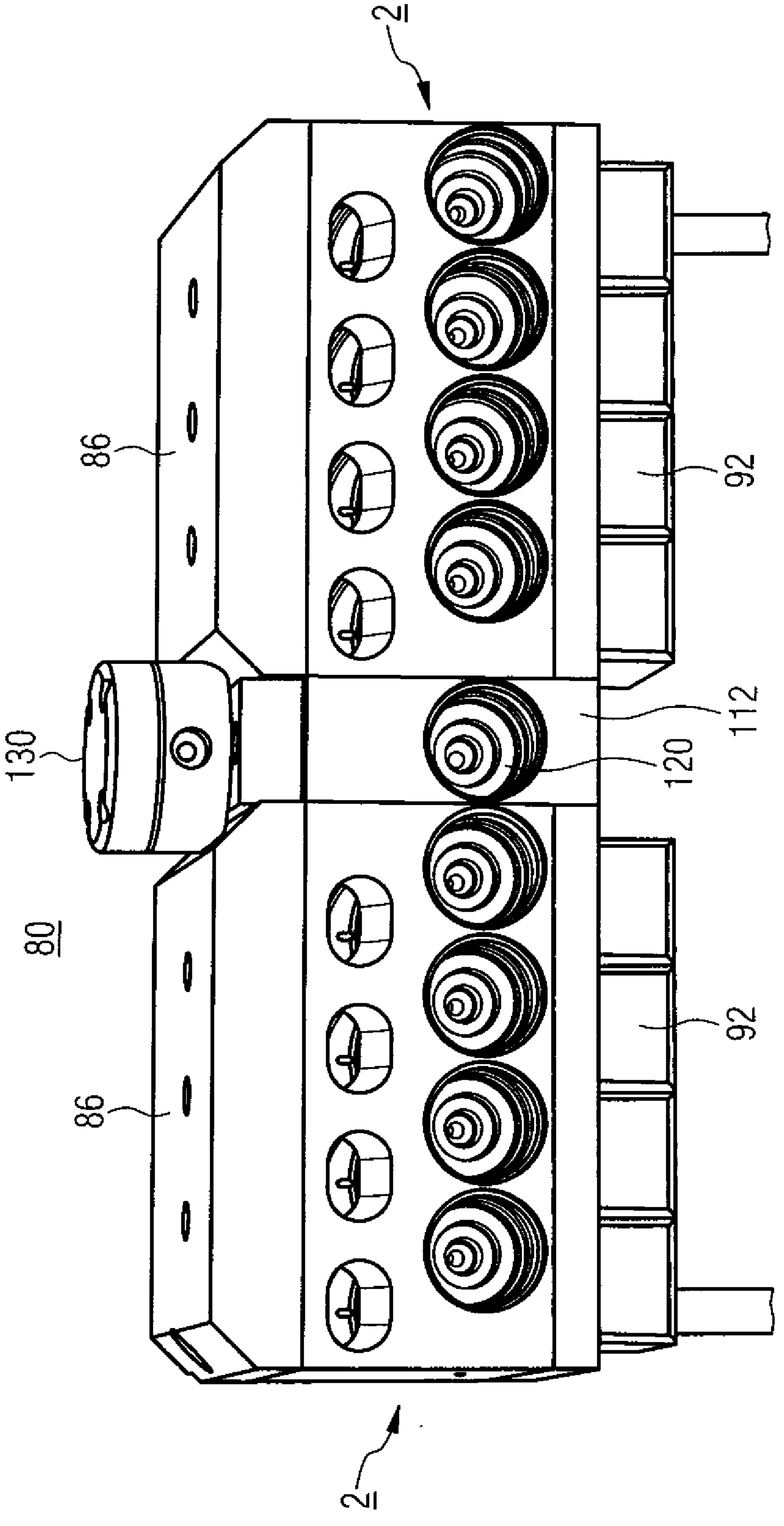
FIG. 4 is a diagrammatic, perspective view of the color changer having two valve blocks according to FIGS. 1 and 2 and a center block in a further preferred embodiment.

A color changer 80 is shown in a further preferred embodiment in FIG. 4. The color changer 80 has two valve blocks 2, between which a center block 112 is mounted. Each of the two valve blocks 2 is screwed in each case to an actuating plate 86 and a paint connection plate 92. The two central color channels 20 of the two valve blocks 2 open in each case into the center block 112, to be precise into an application line (not shown) there. Valve bores 120 for at least 2 release valves are provided in the center block, into which valve bores 120 valves can be inserted which, as required, in each case make the throughflow of the paint possible from one of the two central color channels 20 into the application line in the center block 112. Furthermore, a paint pressure regulator 130 is connected to the center block 112, by way of which paint pressure regulator 130 the output pressure of the paint to the atomizer (not shown here) can be set.

Figure 5:
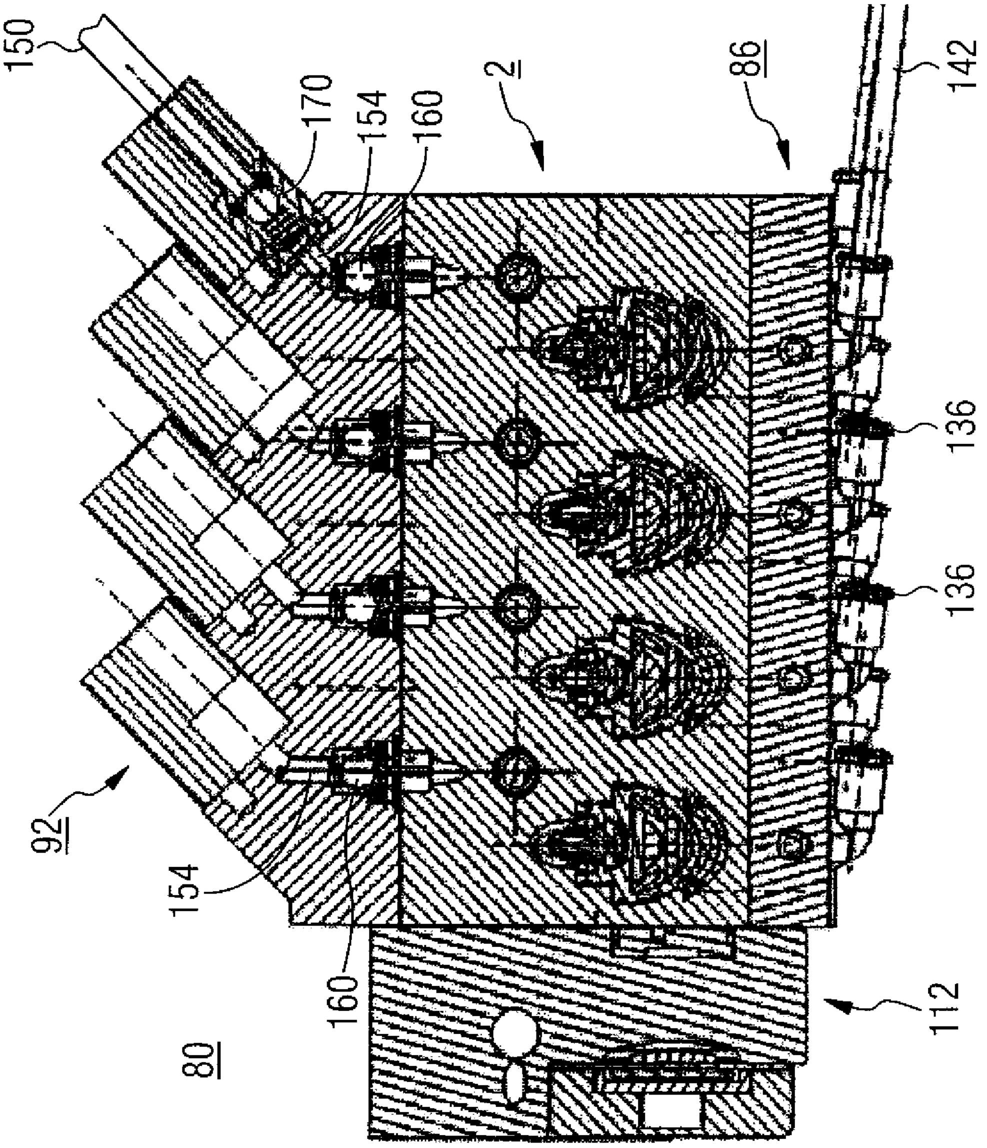
FIG. 5 is a diagrammatic, cross-sectional view through the color changer having the paint connection plate and the actuating plate.

FIG. 5 shows a cross section through the color changer 80 having the valve block 2, the center block 112, the actuating plate 86 and the paint connection plate 92. Connections 136 for compressed gas lines 142 are provided on the actuating plate 86, by way of which compressed gas lines 142 the valves which are inserted into the valve bores 26, 32, 38, 44 can be actuated pneumatically. Nonreturn valves 160 are inserted into the paint connection plate 92, into the paint feed channels 154 between the paint feed lines 150 and the respective feed line openings 50 in the valve block 2. The nonreturn valves 160 prevent paint from leaking out of the paint connection plate 92 when the latter is dismantled, which would otherwise happen, since the paint feed lines 150 are pressurized. In this way, paint waste during the dismantling of the paint connection plate 92 can be avoided.

Figure 6:
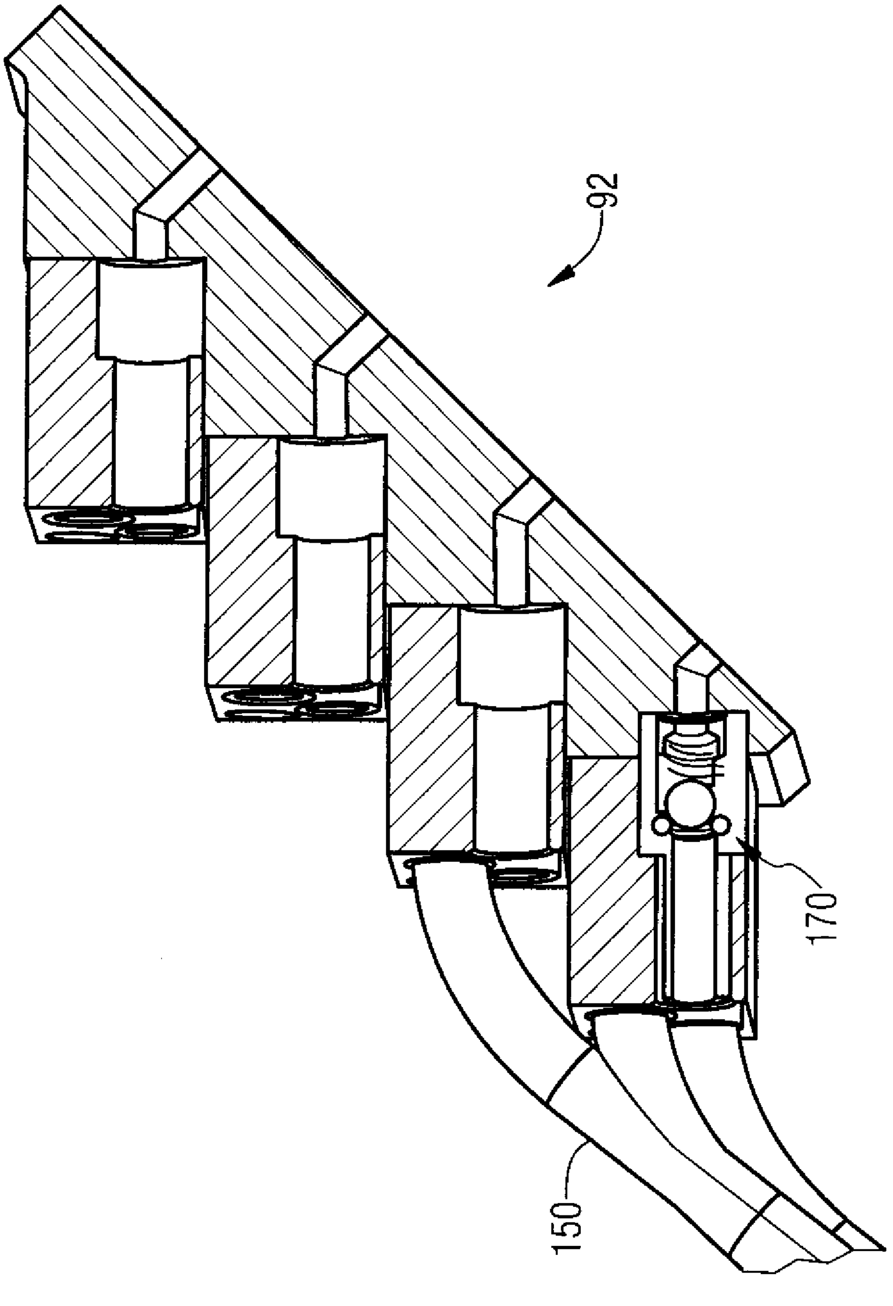
FIG. 6 is a diagrammatic, sectional view through the paint connection plate.

A second group of nonreturn valves 170 is inserted in each case into the paint feed channels 154. The nonreturn valves 170 prevent, if there is a possibly present leak of at least two valves in the valve block 2 of the color changer 80, the paint of one color shade from being able to penetrate into the line of the other color shade and from being able to advance via the paint feed line 150 into its storage container, as a result of which great quantities of paint would become unusable. The functionality of both nonreturn valves 160 and 170 can also be realized by way of a single nonreturn valve. To this end, a flatter valve can be used, for example. Furthermore, FIG. 6 shows a section through a perspective illustration of the paint connection plate. The paint feed lines 150 which lead into the paint connection plate 92 and the nonreturn valves 170 which are used can be seen.

Color changers having valve blocks with more or less than 4 groups of valve bores also belong to the core concept of the invention described here, which color changers result as a generalization of the exemplary embodiments which are shown here.

The invention claimed is:

1. A color changer, comprising:

at least one valve block for connecting a plurality of coating material lines to an application device, said valve block having a housing configured as a parallelepiped, said housing having a central color channel with an axial direction and a plurality of valve bores formed therein for receiving valves, said valve bores including a first number of substantially parallel valve bores opening into said central color channel at first openings, and a second number of substantially parallel valve bores opening into said central color channel at second openings on a diametrically opposite side of said central color channel and offset in the axial direction with respect to said first number of valve bores, said valve bores further having a third number of substantially parallel valve bores opening into said central color channel at third openings, in each case one of said first openings and one of said third openings opening into said central color channel in a same axial position, and a fourth number of substantially parallel valve bores opening into said central color channel at fourth openings, in each case one of said fourth openings and one of said second openings opening into said central color channel in the same axial position.

2. The color changer according to claim 1, wherein in each case said first, second, third and fourth number of valve bores forming first, second, third and fourth valve bore rows respectively, in each case said first and said fourth, said second and said third, and said third and said fourth valve bore rows forming an acute angle with respect to one another.

3. The color changer according to claim 1, wherein said housing is a cuboidal housing, said first and second valve bores emerging from said housing on opposite cuboid faces, and said third and fourth valve bores emerging from said housing on a further cuboid face which is perpendicular with respect to said opposite cuboid faces.

4. The color changer according to claim 1, wherein in each case four of said valve bores of said first, second, third and fourth number of valve bores are provided.

5. The color changer according to claim 4, wherein said central color channel has a color channel start, a color channel end, and a length of less than 120 mm in said axial direction between said color channel start and said color channel end.

6. The color changer according to claim 1, wherein in each case two adjacent ones of said valve bores opening into said color channel at an average spacing of less than 8 mm.

7. The color changer according to claim 1, wherein said housing has a plurality of feed line openings formed therein for a supply of paint; and further comprising a paint connection plate having paint feed channels formed therein opening into connections for paint feed lines, it being possible for said paint connection plate to be screwed to said housing of said valve block, and said paint feed channels being connected to said feed line openings in a screwed state.

8. The color changer according to claim 7, further comprising paint discharging lines; and wherein said paint connection plate has connections for said paint discharging lines, said paint discharging lines and said paint feed lines being connected to one another in order to circulate the paint.

9. The color changer according to claim 7, further comprising nonreturn valves disposed in said paint feed channels in said paint connection plate, said nonreturn valves shut off a return flow of paint out of said valve block into said paint feed lines.

10. The color changer according to claim 7, further comprising nonreturn valves disposed in said paint feed channels in said paint connection plate, said nonreturn valves shut off a leakage of the paint out of said paint connection plate when said paint connection plate is dismantled from said valve block.

11. The color changer according to claim 7, further comprising nonreturn valves disposed in said paint feed channels in said paint connection plate, said nonreturn valves shut off both a return flow of paint out of said valve block into said paint feed lines and a leakage of the paint out of said paint connection plate when said paint connection plate is dismantled from said valve block.

12. The color changer according to claim 11, wherein said nonreturn valves are flatter valves.

13. The color changer according to claim 1, further comprising:

a plurality of valve channels formed in said housing, in each case one of said valve channels being assigned to one of said valve bores; and an actuating plate having a plurality of connections for actuating channels for the valves, it being possible for said actuating plate to be screwed to said housing of said valve block, and the actuating channels being connected to said valve channels in a screwed state.

14. The color changer according to claim 13, further comprising:

a common compressed gas line;

pneumatically actuable valves which are in each case connected via said valve channels to said common compressed gas line being inserted into said valve bores;

electrovalves which open a connection between said common compressed gas line and said actuating channels being inserted into said actuating plate; and a control unit connected electrically to said electrovalves being provided to control said electrovalves.

15. The color changer according to claim 1, wherein said block valve is one of two valve blocks;

further comprising a center block with an application line, said central color channel of a respective one of said valve blocks being routed in each case via a connecting line into said center block and being connected to said application line for connection to the application device; and pneumatically actuable valves opening and closing a connection between the respective connecting line and the application line with one of said pneumatically actuable valves being provided for each of said connecting lines.

* * * * *